J. L. BOND.
Pawl and Ratchet Mechanism.
No. 159,016. Patented Jan. 26, 1875.
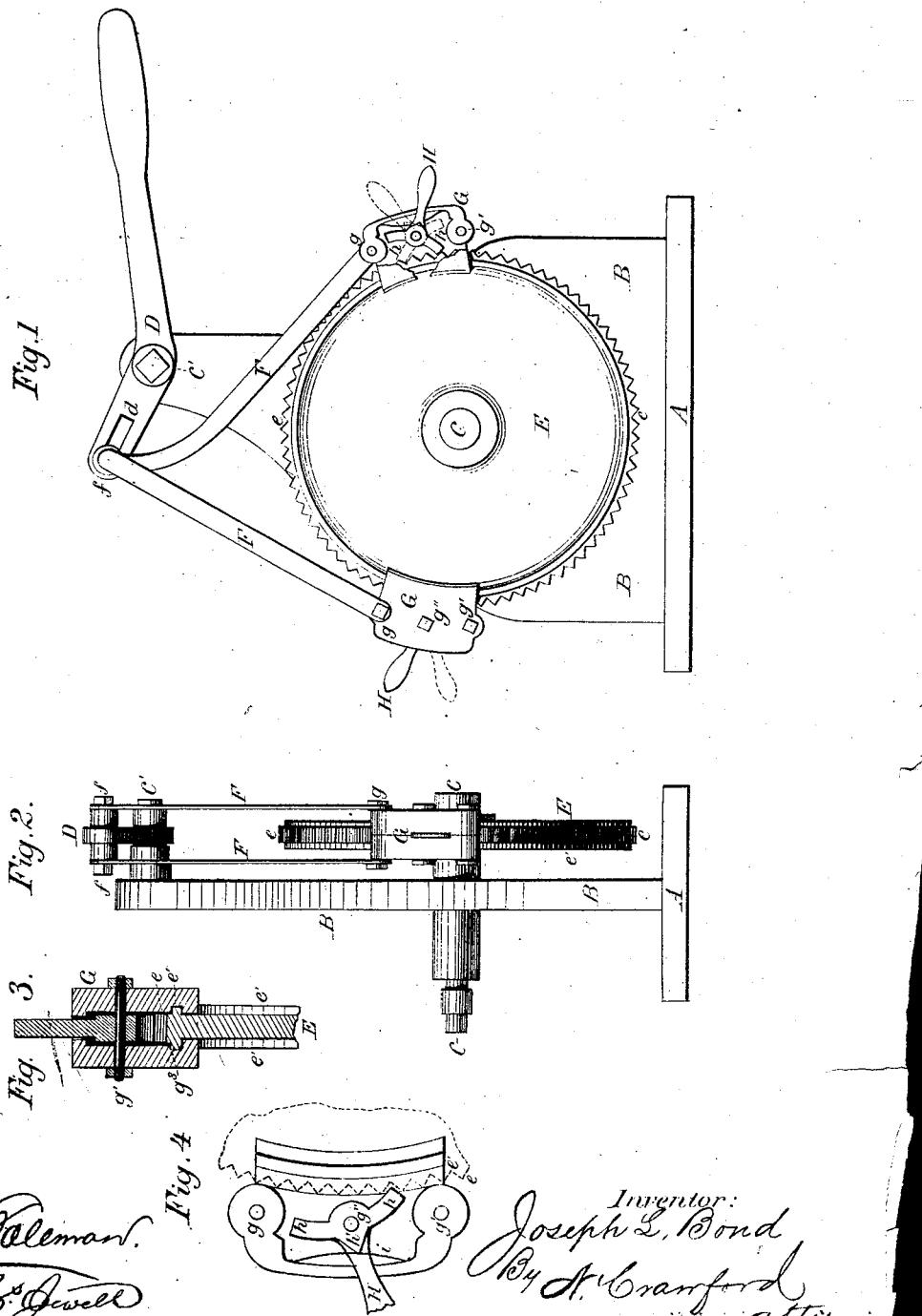

UNITED STATES PATENT OFFICE.

JOSEPH L. BOND, OF PORT HURON, MICHIGAN.

IMPROVEMENT IN PAWL-AND-RATCHET MECHANISMS.

Specification forming part of Letters Patent No. 159,016, dated January 26, 1875; application filed December 14, 1874.

*To all whom it may concern:*

Be it known that I, JOSEPH L. BOND, of Port Huron, in the county of St. Clair, in the State of Michigan, have invented certain Improvements in Mechanical Movements, of which the following is a specification:

The object of this invention is to improve that kind of mechanical movement in which a single ratchet-wheel is used, and two pawls on opposite or nearly on opposite sides of the ratchet-wheel are employed; and it consists in the construction and arrangement of the parts and their operation, as will be fully hereinafter described.

In the drawings, Figure 1 is an upright side view of the device. Fig. 2 is an edge view of same; Figs. 3 and 4, enlarged details.

A is the base that supports the device, and may be a floor or a part of a machine that the device is to operate or give motion to. B is the support to the shaft and actuating parts of the device. C is the shaft that is fixed to the center of the ratchet-wheel, and revolves with the wheel, and is journaled in proper bearings in the support B; or the wheel may revolve on shaft C, while the shaft is fixed in support B. C' is the fulcrum-pin, fast in support B, and upon which the actuating-lever vibrates. D is the actuating-lever, pivoted upon the fulcrum-pin C', and upon which it works. $d$ is a slot in the outer end of lever D, in which slot the bolt, to which the connecting-links that actuate the boxes containing the pawls are fast, can have freedom of action, so that no binding of parts will result. E is the ratchet-wheel, of any desired diameter and any number of teeth, $e$, on its periphery, and has projecting at the base of teeth $e$ on each side a flange, $e'$. F F are the connecting-links or rods, freely turning upon pin $f$ in slot $d$ of lever D, and attached to the pawl-boxes G at $g$, so as to freely reciprocate the boxes and pawls. The boxes G are each made of two parts, and are bolted and held together by screw-bolts $g'$ $g''$, that go transversely through them. The pawls have a circular groove, $g^3$, near their inner edges, that receive the projecting flange $e'$ on wheel E, which serves as a guide to the boxes, and assists in holding them onto the ratchet-wheel E when in action. H H are pivoted reversible pawls, working in boxes G on the bolts $g''$, that act as the axis upon which the pawls H turn. These pivoted pawls have their engaging ends $h$ upon opposite sides of the axis on which the pawls turn, so that they can be turned to bring either end or dog $h$ into the notches or teeth $e$ of the ratchet-wheel E, and when one end of each pawl is in contact with the teeth $e$, and the lever D is vibrated in either direction, the wheel E will be revolved in one direction, and by turning the pawls so that the other dog or end $h$ will be in contact with the teeth $e$ of wheel E, as seen in dotted lines in Fig. 1, the wheel will be revolved in the reverse direction. $i$ is a spring in box G, bent so as to bear upon a projection, $h'$, on the pawl H, and causes the end or dog $h$ to keep its hold in the teeth of wheel E, whether one end or the other may be in action, and prevent its changing its position or hold upon the teeth until the dog $h$ is purposely reversed, in order to prevent the other dog or end from going into action upon the teeth and reverse the direction of revolution of the ratchet-wheel. It will be observed that the links F, that connect the pawl-boxes with the actuating-lever, are all pivoted at the same point, $f$, and to the same pivot-pin; hence there is the same power exerted upon the actuating-pawls when the lever is reciprocated, whether the pawl in one or the other box may be in action, as the fulcrum is the same, whether one pawl on one side of the wheel is acting upon the wheel, or that on the other side; hence there is no loss of power, as there generally is where the pawl on one side of the wheel is connected to the lever between the fulcrum and the power. This movement can be applied to many different machines, such as ships' windlasses, winches, hoisting or lifting jacks, and especially to operate the set-works of a saw-mill carriage in circular or other saw mills for sawing wood or stone, as it can be reversed in its action to set the knees of the log-carriage up toward the saw or return them back after the log is disposed of.

Having thus described my invention, what I claim is—

1. The combination of the slotted lever D, working on fulcrum C', the connecting-links F F, pivoted at $f$ to lever D, and movable boxes G, containing pawls H H, with the ratchet-wheel E, constructed and arranged to operate the ratchet-wheel in one direction, substantially as and for the purpose described.

2. The pawl-boxes G, constructed with grooves $g^3$, in combination with the flange $e'$ on the sides of the ratchet-wheel E, substantially as and for the purposes described.

3. In a mechanical movement, as above described, the combination of the lever D and the two connecting-links F with movable boxes G, containing reversible pawls H, to revolve the ratchet-wheel continuously in either direction, substantially as described.

JOSEPH L. BOND.

Witnesses:
CHAS. MORDOCK,
F. E. BOVEE.